United States Patent

Eriksson

[15] 3,682,487

[45] Aug. 8, 1972

[54] ARRANGEMENT IN DISK-FORMED BODY, IN PARTICULAR IN A RECORD

[72] Inventor: Hans Gustav Eriksson, Sankt Erikegatan 65, 113 20 Stockholm, Sweden

[22] Filed: Jan. 6, 1971

[21] Appl. No.: 104,228

[30] Foreign Application Priority Data

Jan. 23, 1970 Sweden ........................796/70

[52] U.S. Cl. ................................................274/42 R

[51] Int. Cl. ................................................G11b 3/62

[58] Field of Search..................274/39 R, 42 R, 42 A

[56] References Cited

UNITED STATES PATENTS

| | | | |
|---|---|---|---|
| 832,403 | 10/1906 | Milans | 274/42 |
| 1,150,020 | 8/1915 | Ettlinger | 274/42 |
| 1,637,544 | 8/1927 | Bishop | 274/42 |
| 3,132,866 | 5/1964 | Nitti et al. | 274/42 |
| 2,734,748 | 2/1956 | Parvin | 274/42 |
| 1,732,747 | 10/1929 | Germain | 274/42 |
| 1,821,916 | 9/1931 | Acheson et al. | 274/42 |

FOREIGN PATENTS OR APPLICATIONS

| | | | |
|---|---|---|---|
| 324,534 | 1/1930 | Great Britain | 274/42 |

*Primary Examiner*—Harry N. Haroian
*Attorney*—Holman & Stern

[57] ABSTRACT

A phonograph record having a stepped inner annular area terminating in a central hole. A plurality of radial slits extended from the central hole through the entire extent of the inner annular area and recesses are provided to facilitate axial bending of the stepped landings.

6 Claims, 6 Drawing Figures

ARRANGEMENT IN DISK-FORMED BODY, IN PARTICULAR IN A RECORD

The present invention in general refers to an arrangement in a disk-formed body, in particular in a record, and more specifically the invention is concerned with an arrangement in a disk-formed body of the kind provided with a center hole by means of which the body is intended to be mounted on an axle journal. The purpose of the invention is to facilitate the mounting on the disk-formed body on the axle journal and in the particular performance of the invention to facilitate the mounting of the record on the center pin of the gramophone turntable. A problem arising in the mounting of the record on the gramophone center disk is to get the center hole of record alined with the center pin of the gramophone disk in order that the record may be put onto said pin. In view of solving this problem it has previously been proposed to form the free end of the center pin as a rounded part. If the radius of the center pin is denoted "r" the record will get a zone enabling or facilitating the mounting thereof the area of which corresponds to $\pi(2r)^2$ instead of the area $\pi r^2$ which will be obtained if the free end of the center pin is not rounded.

It is also previously known to form the center hole of the record with a conical entrance part and in this way it is possible to increase the said mounting zone to an area substantially corresponding to $\pi(3r)^2$, if the free end of the center pin is at the same time formed rounded.

By the present invention it has been made possible to increase the said zone for facilitating the mounting of the record onto the center pin of the turntable to an area substantially corresponding to $\pi(4r)^2$ or even a still greater area depending on the friction coefficient between the substances of the record and the center pin. This is obtained by the characteristics set forth in the appended claims.

The invention will now be explained more in detail with reference to a preferred embodiment thereof. It should however be understood that the following detailed description is not restricting for the scope of the invention, but all kinds of modifications may be presented within the frame of the appended claims.

In the description it will be referred to the attached drawings of which

Figure 1:
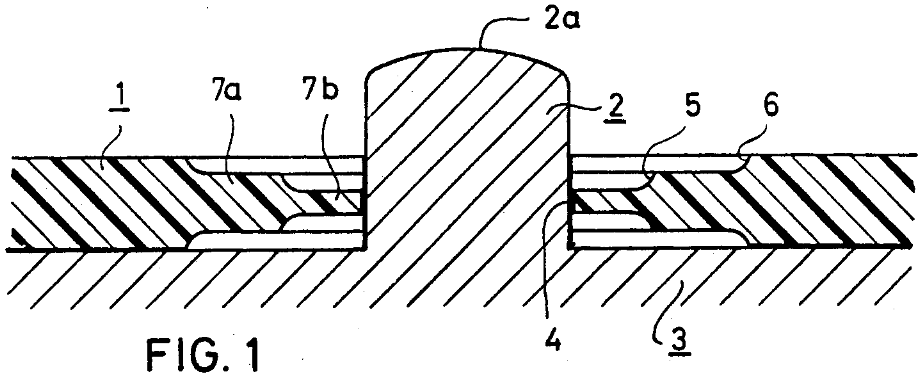
FIG. 1 is showing a fragmentary corss section through a turntable having a record mounted thereon.
Figure 2:
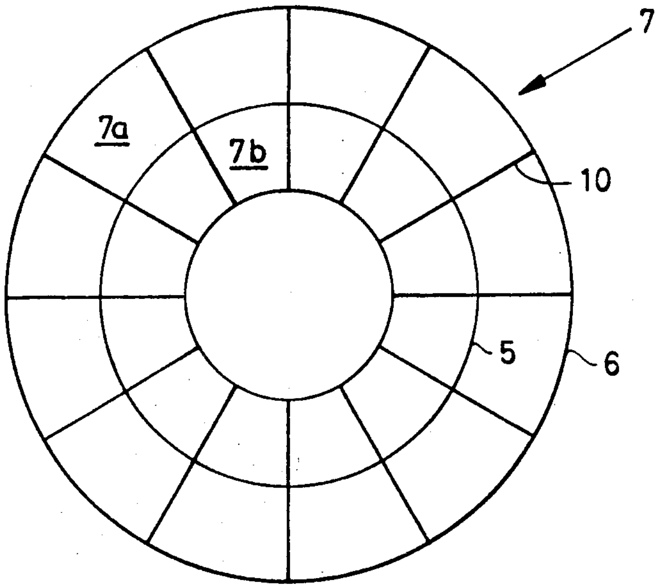
FIG. 2 is showing the device in FIG. 1 seen from above.

In the drawings a record 1 is shown adapted on the center pin 2 of the turntable 3 belonging to a gramophone. The record is in the conventional manner provided with a center hole 4 and round said hole 4 the record is formed with steps 5 and 6. The object of said steps 5 and 6 is to facilitate the mounting of the record onto the center pin 2 and the steps thereby serve to guide the record into alignment with the center pin of the turntable. This is accomplished by the stepped landings 6 and 5 sprectively sliding along the rounded free end *2a* of the center pin 2 until the record 1 with the center hole 4 thereof slides axially down over the pin 2.

Figure 3:
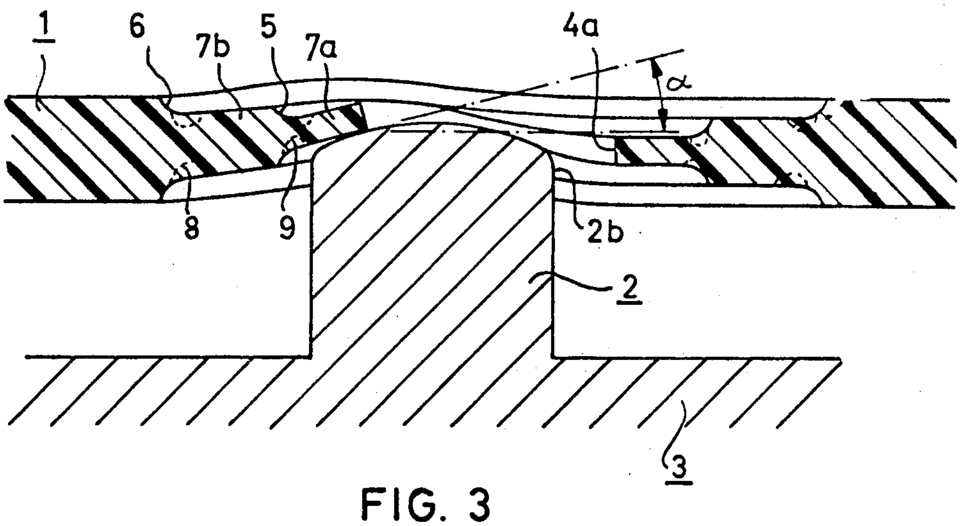
FIG. 3 is showing in the same manner as in FIG. 1 a modified embodiment of the invention.

The stepped landings 5 and 6 form together a double annular guide 7 for the record including an inner ring *7a* and an outer ring *7b*. This annular guide 7 which is concentrical with the center hole 4 of the record is preferably dimensioned with a thickness so as to elastically yield due to the weight of the record 1 when sliding over the rounded upper end *2a* of the pin 2. This has as an effect that the angle $\alpha$ between the transversal plane of the pin 2 and the tangent for the innermost part of the inner ring *7a* is encreasing during this resilient yielding what further contributes to an active guiding of center hole 4 towards the pin 2. This also has as an effect that the point *2b* of the pin, with the indications used in FIG. 3, will meet the record at the point *4a*, since the part of the guide 7 which is not bent upwards as well as the part of the record located outside the guide will be positioned lower than the inner edge of the part bent upwards what ensures that the pin 2 will enter the center hole 4 of the record.

In order to further facilitate the bending upwards of the annular guide 7 recesses 8 may be provided somewhere adjacent to the outer periphery of the annular guide 7 and in this case the outer ring *7b* will be slightly bent upwards already when the pin 2 slides over the outer landing 6 and meets the surface of the outer ring *7b*. Likewise recesses 9 may be provided adjacent to the step 5 between the inner ring *7a* and the outer ring *7b* whereby a further increased bendability of the guide 7 will be obtained. In order to further facilitate the bending upwards of the guide 7 radial slots 10 may also be provided running in alignment with each other through the outer ring *7b* and the inner ring *7a*.

Figure 4:
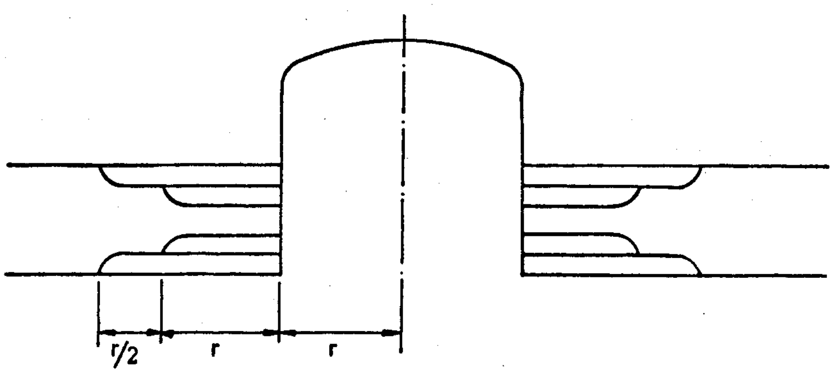
FIG. 4 is showing in the same manner a further modified embodiment of the invention.

In FIG. 4 is indicated as an example how the guide 7 may be dimensioned and from the drawing is evident that the inner ring *7a* has about the same radial width as the radius of the center pin 2, while the outer ring *7b* has a radial width which is half the size as the radius of the center pin 2.

Figure 5:
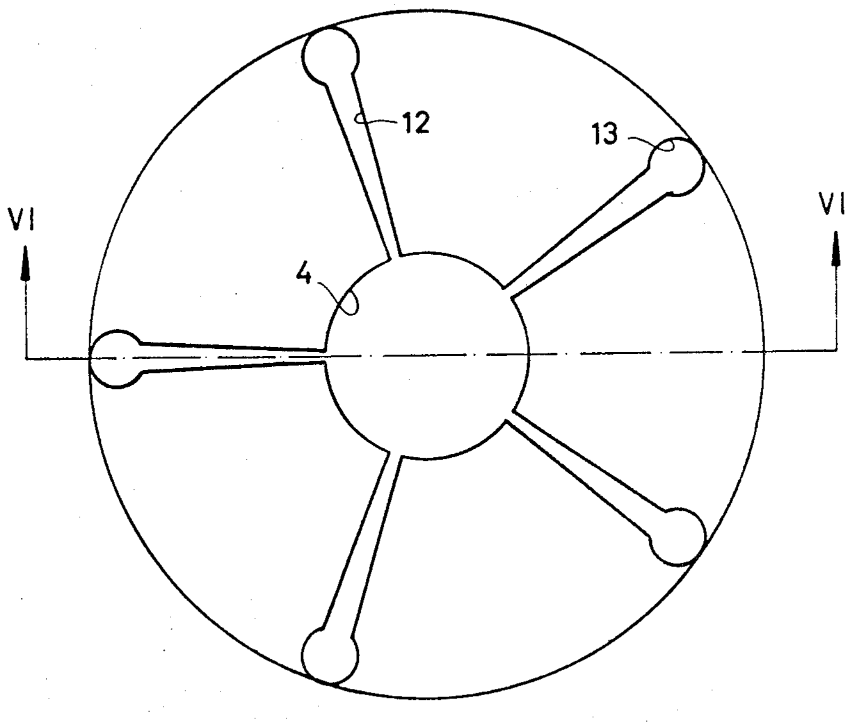
FIG. 5 is a top view in part of a further modified record according to the invention and FIG. 6 is a cross section along the line VI—VI of FIG. 5.
Figure 6:
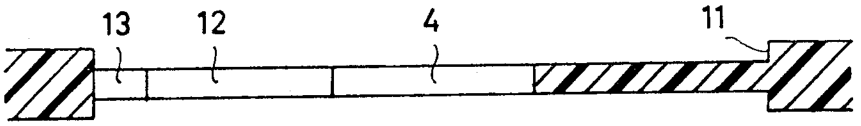

In the modified embodiment of the invention shown in FIGS. 5 and 6 the record is only formed with one single guide step 11 defining the annular guide 7 the thickness of which is substantially less than the rest of the record. Also in this embodiment the guide 7 is formed with radial grooves 12 preferably of some width and in this case the grooves are wedge-formed with the point directed to the center of the guide 7. The grooves may however be of any other suitable shape and size than the one indicated in the drawings. Any number of grooves may be used in the guide but it has shown that five grooves will give a good guiding effect to the record guide whereby the grooves should be symmetrically arranged as shown in FIG. 5. In case of five grooves the wedge-formed guide parts located between the grooves will also get a sufficient strength to eliminate the risk of cracks or ruptures uf said parts even at rough handling. A less number of grooves than five causes a decrease in guiding effect and more grooves than five causes an increase of the risk of cracks or ruptures of the guide parts.

In order to increase the resilient action of the guide parts and thereby of the guiding effect a circular hole 13 is provided at each groove adjacent to the guide step 11 which hole may be of substantially greater diameter than the width of the adjacent part of the groove 12, for instance twice the size or more. The holes 13 cause a decrease of the actual width of the guide parts adjacent to the step 11 what facilitates the bending of the said parts what in turn increases the resilient guiding effect so that the record is easlily guided down with its center hole 4 onto the center pin 2 of the turntable 3.

It is to be understood that the embodiments of the invention described above and shown in the drawings are in no way restricting to the invention but all kinds of modifications may be made within the scope of the following claims.

What I claim is:

1. An improved disk-formed body, particularly a record, said record having a center hole adapted to loosely fit about the center pin of a turntable, an inner annular area disposed adjacent said center hole, and an outer annular portion, said annular area disposed adjacent said center hole being formed of at least one stepped landing having a width less than the width of the outer portion whereby the thickness of the record decreases in a radially inward direction towards said center hole, a plurality of radially outward extending slots disposed through said entire inner annular area and said stepped landings formed therein, means for facilitating the axial bending of said stepped landings above and below the plane of the outer portion of the record, said landings being flexed by the center pin during mounting of the record when the center hole and the center pin are nonaligned, said landings defining guide means for resiliently guiding the record to align the center hole and the center pin, said landings returning to a planar position with respect to the outer portion of the record upon alignment of the center hole with the center pin.

2. A disk-formed body as defined in claim 1, wherein said means for facilitating bending comprises at least one annular recess adjacent each stepped landing.

3. A disk-formed body as defined in claim 2, wherein two stepped landings are provided, each landing being of a different thickness.

4. A disk-formed body as defined in claim 2, wherein only a single stepped landing is formed in said inner annular area and wherein five symmetrically arranged radial slots are provided throughout said annular area, each of said slots having a finite horizontal width.

5. A disk-formed body as defined in claim 4, wherein each of said slots are wedge-shaped with the point thereof directed towards the center of the record.

6. A disk-formed body as defined in claim 1, wherein said slots are formed with a circular hole disposed at one of the slot ends adjacent said stepped landing, the diameter of said circular hole being substantially greater than the width of the adjacent portion of the slot.

* * * * *